Figure 1:
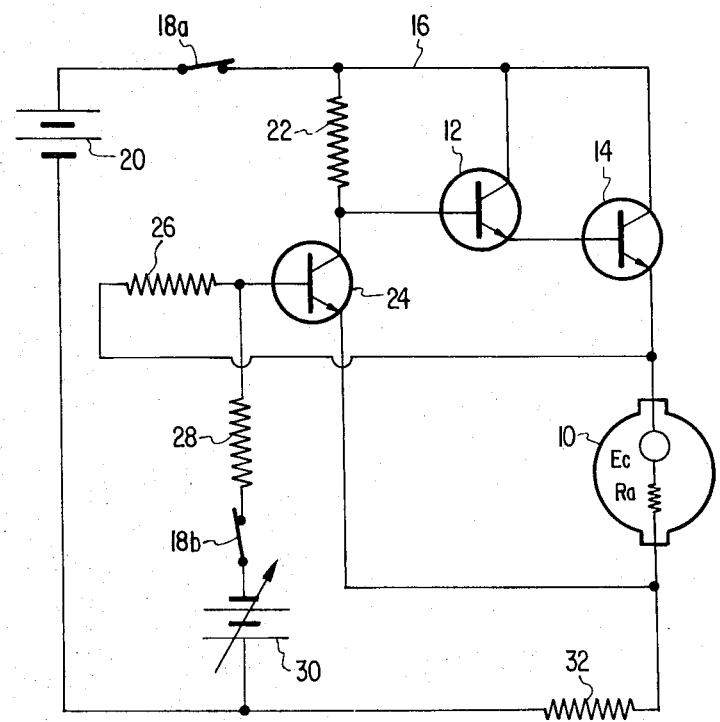

United States Patent

[11] 3,566,229

[72] Inventor Richard L. Wickens
Hawthorne, N.J.
[21] Appl. No. 751,671
[22] Filed July 23, 1968
[45] Patented Feb. 23, 1971
[73] Assignee Servo-Tek Products Company
Hawthorne, N.J.

[54] MOTOR CONTROL CIRCUIT
12 Claims, 2 Drawing Figs.
[52] U.S. Cl. .................................................. 318/308, 318/332, 318/380
[51] Int. Cl. ...................................................... H02p 5/16
[50] Field of Search .......................................... 318/331, 332, 345, 269; 318/379, 376, 380, 381, 308

[56] References Cited
UNITED STATES PATENTS
| | | | |
|---|---|---|---|
| 3,320,507 | 5/1967 | Ford et al. | 318/380X |
| 3,379,949 | 4/1968 | Todd | 318/376X |
| 3,440,511 | 4/1969 | Igarishi | 318/380X |

Primary Examiner—Oris L. Rader
Assistant Examiner—Robert J. Hickey
Attorneys—Eugene L. Bernard, John Boustead, Martin J. Brown, Henry W. Foulds, Jr., Roger T. McLean, W. Brown Morton, Jr., John T. Roberts, John W. Routh, N. Dale Sayre, Malcolm L. Sutherland, J. Donald Tierney, Curt Von Boetticher, Jr. and McLean, Morton and Boustead ABSTRACT: A control circuit for a direct current shunt motor. The motor armature is serially connected with a current control element and a current sensing element across a direct voltage source. A first voltage loop includes the armature, a portion of the current control element, and a current passage element. A second voltage loop includes the current sensing element, the portion of the current control element, a variable direct voltage source, and a second current passage element which is connected to the first current passage element for serial current flow therethrough. A voltage variation in either loop causes a current variation in the two current passage elements which maintains the motor counter electromotive force substantially equal to the voltage from the variable source. Automatic dynamic braking can be provided by a current passage means across the armature and responsive to current flow through the armature.

PATENTED FEB23 1971 3,566,229

INVENTOR
RICHARD L. WICKENS

BY  McLean, Morton & Boustead
ATTORNEYS.

MOTOR CONTROL CIRCUIT

The present invention concerns a motor control circuit. More particularly the present invention concerns a control circuit for a direct current shunt motor in which the motor speed is accurately and effectively controlled by forcing the motor counter e.m.f. to equal a preset value.

Direct current shunt motors are utilized in a variety of applications. In many of these applications it is desirable to be able to control the motor speed over some range with a constant load on the motor. Likewise, in certain applications, it is desirable to have a motor operate at a constant speed even though the load upon it varies, thus requiring a varying torque output from the motor. In addition, variations in supply voltage and in temperature sometimes occur, and it is desirable to have the speed at which a motor operates maintained constant throughout these variations. When it is desired to change the speed at which a motor is operating, a new speed setting can be made. The motor then changes its speed to that setting. Due to inertia, the motor speed tends to continue changing beyond the new desired setting. This overshoot is ultimately detected, and the motor causes its speed to vary back toward the desired new setting. Once again, inertia may carry the speed beyond the desired new setting until it is again detected, and the speed change again reversed. The resulting oscillations may continue for some time, until ultimately they damp out. It is desirable to change the motor speed rapidly and with a minimum of overshoot or oscillation.

The present invention is a motor control circuit, in one aspect providing rapid and effective control of the motor speed so that speed changes can be made under constant motor load and so that motor torque load variations do not cause the motor speed to vary from its desired constant value. In this aspect the motor control circuit includes two interconnected balanced voltage loops, one of which includes the motor counter electromotive force (e.m.f.) voltage and the other of which includes a speed control voltage. To vary the motor speed, the speed control voltage is changed. The resulting unbalance in its voltage loop causes a change in current through the interconnection of the two loops. Consequently, the other voltage loop is unbalanced until the motor speed varies to change the counter e.m.f. to equal the new speed control voltage. Likewise, variations in torque cause the armature current to vary, thereby varying the counter e.m.f. The unbalance in the voltage loops again affects current through their interconnecting elements and causes the motor speed to vary, returning the counter e.m.f. to its original value, equal to the speed control voltage. Consequently, the motor speed remains at its original value.

In a second aspect, the motor control circuit of the present invention further includes a braking circuit automatically switched into operation when it is desired to reduce the motor speed. This circuit provides a path through which the generator action of the motor causes a high current to flow, thereby setting up a reaction torque opposing the armature rotation and braking the motor speed until the counter e.m.f. has been reduced to the desired new control voltage setting.

Figure 2:
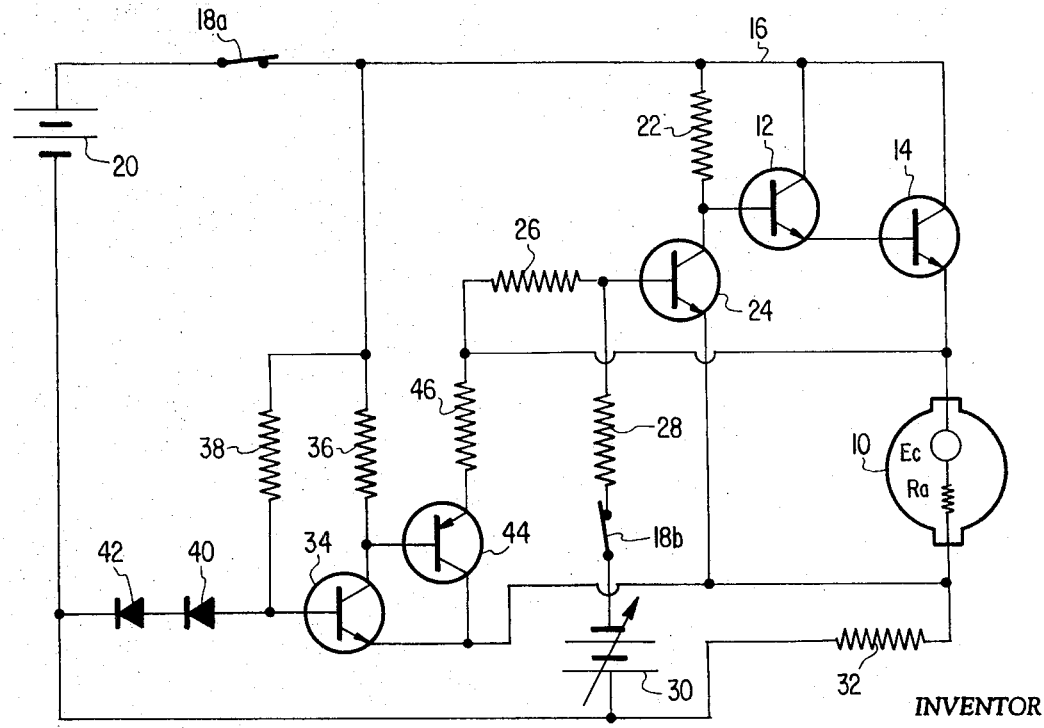

These and other aspects and advantages of the present invention are apparent in the following detailed description and claims, particularly when read in conjunction with the accompanying drawings in which like parts bear like reference numerals. In the drawings:

FIG. 1 is a schematic diagram of a first embodiment of a motor control circuit incorporating the present invention; and FIG. 2 is a schematic diagram of a second embodiment of a motor control circuit in accordance with the present invention.

The armature 10 of a direct current shunt motor is depicted in FIG. 1 as comprising the series combination of voltage source $Ec$, being the counter e.m.f. generated by the motor as it operates, and resistance $Ra$, being the armature resistance or internal resistance of the motor. NPN transistors 12 and 14 are connected as cascaded emitter-follower amplifiers, each having its collector connected to power line 16 which is coupled through switch 18a to the positive terminal of direct voltage source 20. The emitter of transistor 12 is directly connected to the control element or base of transistor 14. The emitter of transistor 14 is tied to one side of armature 10. The control element or base of transistor 12 is coupled through resistor 22 to power line 16. The base of transistor 12 is also tied to the collector of NPN transistor 24 which has its emitter tied to the second side of armature 10 and its control element or base coupled through resistor 26 to the emitter of transistor 14. The base of transistor 24 is also coupled through resistor 28 and switch 18b to the negative terminal of variable direct voltage source 30. Switches 18a and 18b are ganged to operate together. The positive terminal of voltage source 30 is tied to the negative terminal of direct voltage source 20. The junction of the emitter of transistor 24 and the second side of armature 10 is coupled through resistor 32 to the junction of voltage sources 20 and 30.

Resistor 22 is of a high value, for example in the order of several megohms. Resistor 32 has a value equal to $Ra$, the internal resistance of armature 10. This is a low value in the order of about .01 ohms to 3 ohms. Resistors 26 and 28 are of equal value, each being a resistance in the order of about 20,000 ohms. Direct voltage source 20 provides a voltage $E20$ of a magnitude required by the direct current motor, for example a voltage in the order of 60 volts. Variable voltage source 30 provides a voltage $E30$ equal to the expected counter e.m.f. generated by armature 10. Thus voltage source 30 might be a variable voltage source capable of a maximum output equal to the voltage $E20$ from voltage source 20 and capable of being smoothly reduced to a lower value such as a value about half the voltage $E20$ of source 20.

When the motor is operating at a constant speed with a constant torque load on it, a constant current $Ia$ flows through armature 10 to resistor 32. Consequently, there is a constant voltage drop $Ea$ across resistor $Ra$. Since resistor 22 is of a value much greater than the resistance $Ra$ of armature 10, only a negligible current flows through the collector-emitter circuit of transistor 24 to resistor 32. Consequently, the voltage drop across resistor 32 is substantially entirely caused by the constant current $Ia$ through armature 10. Resistor 32 thus senses the armature current. This voltage drop across resistor 32 is accordingly a substantially constant value $E32$. Since resistor 32 is equal to $Ra$, voltage drop $E32$ is substantially equal to the voltage drop $Ea$.

The current in the collector-emitter circuit of transistor 14 flows through resistors 26 and 28, in addition to flowing to armature 10. With the motor operating at a constant speed and with a constant current flow, there are two balanced voltage loops. The first loop includes resistor 26, the base-emitter path of control element transistor 24, the motor counter e.m.f. voltage $Ec$, and the motor internal resistance $Ra$. The second loop includes resistors 28 and 32, the base-emitter path of transistor 24 and the variable voltage source 30. In each instance the very small voltage drop across the base-emitter circuit of transistor 24 is negligible, and so when these two voltage loops are balanced, the following conditions are satisfied:

$E30 - E28 + E32 - 0$ and $Ec - E26 + Ea = 0$. Since resistor 26 and resistor 28 are equal and the same current flows through them, $E26$ is equal to $E28$. Likewise, $Ea$ is equal to $E32$. As a consequence, $E30$ must equal $Ec$. Since the counter e.m.f. voltage $Ec$ is directly proportional to the speed of rotation of the motor armature, it follows that the motor speed is directly proportional to $E30$, the control voltage.

Calling the transistor 14 collector-emitter voltage drop $E14$, the voltage on the base of transistor 24 is approximately [$E20-E4-R26(E20+ E30) (R26+ R28)$ ]. When it is desired to change the motor speed, the control voltage $E30$ is adjusted to the desired new speed setting. For example, if it is desired to increase the motor speed, $E30$ is adjusted to a higher value. As a result the voltage on the base of transistor 24 decreases, thereby increasing its collector voltage and causing transistor 14 to conduct more heavily. The increased current through resistor 32 causes the voltage E32 to increase. To maintain the second voltage loop in a balanced condition, the voltage E28 must make a corresponding change; thus increasing by an amount equal to the sum of the increases in voltages E30 and E32. The increase in voltage E28 means that an increase in current through resistor 28 must take place. Since this same current passes through resistor 26, there is a corresponding increase in the voltage drop E26 across that resistor. The increased conductivity of transistor 14 decreases E14, thereby increasing the level of the voltage applied by the emitter of transistor 14 to the first side of the armature. Consequently the motor speed increases, increasing the counter e.m.f. Ultimately the circuit returns to a balanced condition in which the counter e.m.f. voltage Ec equals the new motor control voltage E30, and the armature current Ia is at its initial level. When it is desired to decrease the motor speed, the motor control voltage E30 is decreased to the desired new setting, and corresponding action reduces the motor counter e.m.f.

In a similar manner, a change in the torque load on the motor results in a corresponding change in the motor counter e.m.f., which by regulator action returns to its original value, maintaining the motor speed constant. Thus, if the motor load and thus the motor torque increase, the armature current Ia likewise increases, and the counter e.m.f. voltage Ec decreases. There is accordingly an increase in the voltage drop Ea across the motor internal resistance Ra, and an identical increase in the voltage drop E32 across resistor 32. Since the motor control voltage E30 is constant, there must be a corresponding increase in the voltage drop E28 across resistor 28 to maintain the second voltage loop in a balanced condition. This results in an increase in current through the serially connected current passage elements, resistors 28 and 26. Consequently there is an increase in voltage drop E26 across resistor 26 which unbalances the first voltage loop. To bring the first voltage loop back into balance, the counter e.m.f. voltage Ec must increase, returning to its original value, equal to the speed control voltage E30. Accordingly the motor speed, which is proportional to the counter e.m.f. voltage Ec, remains at its original value.

The circuit of FIG. 2 provides automatic dynamic braking and oscillatory damping by adding to the circuit of FIG. 1 a current path for the high current resulting from the generator action of the motor. Again, the armature 10 of the direct current shunt motor is depicted as comprising the series combination of voltage source Ec, equal to the counter e.m.f. of the motor, and resistance Ra, equal to the internal armature resistance of the motor. NPN transistors 12 and 14 are connected as cascaded emitter-follower amplifiers between power line 16 and the first side of armature 10. Thus, each transistor 12 and 14 has its collector tied to power line 16 which is coupled through switch 18a to the positive terminal of direct voltage source 20. The emitter of transistor 12 is tied to the base of transistor 14, and the emitter of transistor 14 is tied to the first side of armature 10. The second side of armature 10 is coupled through resistor 32 to the negative terminal of direct voltage source 20. NPN transistor 24 has its collector coupled through resistor 22 to power line 16, its control element or base coupled through resistor 26 to the emitter of transistor 14, and its emitter tied to the second terminal of armature 10. The collector of transistor 24 is also tied to the base of transistor 14. Resistor 28 and switch 18b couple the base of transistor 24 to the negative terminal of variable direct voltage source 30, which has its positive terminal tied to the negative terminal of voltage source 20.

NPN transistor 34 has its collector coupled through resistor 36 to power line 16 and its emitter tied to the junction of resistor 32 and the second terminal of armature 10. The base of transistor 34 is coupled to power line 16 through resistor 38 and is tied to the anode of diode 40. The cathode of diode 40 is tied to the anode of diode 42 which has its cathode connected to the negative terminal of voltage source 20. PNP transistor 44 has its collector tied to the emitter of transistor 34, its base tied to the collector of transistor 34 and its emitter coupled through resistor 46 to the first side of armature 10.

Transistor 34 is thus connected as a switching transistor, utilizing as a control signal the algebraic sum of the voltage drop across resistor 32 and the bias voltage drop across forward biased diodes 40 and 42. Transistor 34 controls transistor 44 which, with resistor 46, is connected as an emitter-follower across armature 10. When the motor is operating at a constant speed and a constant torque, the voltage E32 across the armature current sensing resistor 32 is slightly greater than the bias voltage across forward biased diodes 40 and 42. Consequently, transistor 34 is in a high resistance state, and its collector is at a relatively high voltage. This cuts off transistor 44. When it is desired to reduce the motor speed, the motor control voltage E30 is reduced, as explained with reference to FIG. 1. This increases the voltage on the base of transistor 24, thereby decreasing its collector voltage. Consequently, transistor 12 and thus current passage transistor 14 conduct less heavily, thereby reducing the armature current Ia. As a result the voltage drop E32 across armature current sensing resistor 32 decreases to a value lower than the forward voltage drop across diodes 40 and 42. Transistor 34 then switches to its low resistance state, and its collector voltage drops. This switches on transistor 44. Resistor 46 and the collector-emitter circuit of transistor 44 provide a high-current passage path across armature 10. The generator action of the motor causes a high current to flow through resistor 46 and transistor 44, setting up a reaction torque opposing the armature rotation and thus providing a braking action for the motor. When the motor speed has dropped to a level at which the counter e.m.f. voltage Ec equals the new control voltage setting E30, transistor 14 is again caused to conduct more heavily, and so the voltage across armature current sensing resistor 32 increases to back bias transistor 34, returning it to its high resistance state. The rise in voltage on the collector of transistor 34 cuts off transistor 44, terminating the high-current path across armature 10.

When the motor is at rest and is to be started, switches 18a and 18b are open. The control voltage E30 is set to the desired speed setting, and switches 18a and 18b are then closed. The motor accelerates at a set rate until the counter e.m.f. voltage Ec equals the motor control voltage E30. Because of inertia, the motor tends to continue accelerating. When the counter e.m.f. voltage Ec rises above the motor control voltage E30, transistor 24 conducts more heavily, reducing its collector voltage. As a result the series current control element transistor 14 conducts less heavily, lowering the current to the motor. Therefore, the voltage E32 across resistor 32 decreases, turning on transistors 34 and 44, providing automatic braking action for the motor. As a consequence, the overshoot is reduced, and the speed stabilizes at a value which causes the counter e.m.f. voltage Ec to be equal to the motor control voltage E30. Thus the circuit of FIG. 2 provides braking to slow the motor when it is desired to reduce its speed and prevents overshoot when the motor speed has to be increased. These two actions provide oscillatory damping to prevent oscillating motor speed.

Although the present invention has been described with reference to a preferred embodiment and depicts particular semiconductor types, numerous alterations and rearrangements and changes in semiconductor types can be made, and still the resulting control circuit would be within the scope of the invention.

I claim:

1. Apparatus for controlling the speed of a direct current motor comprising:
   a first direct voltage source;
   a direct current motor having an armature;
   current-sensing means for sensing current flow through said armature;
   current-passage means across said armature and capable of assuming a first state in which current is allowed to flow therethrough and a second state in which current is prevented from flowing therethrough;

switching means connected to said current passage means and responsive to said current sensing means for causing said current passage means to assume its first state in response to the sensing of a first armature current flow condition and to assume its second state in response to the sensing of a second armature current flow condition; and a current control means coupled to the current passage means and including a current passage path connected serially with said armature and said current-sensing means across said first direct voltage source for controlling current flow through said armature in response to the state of said current passage means.

2. Apparatus as claimed in claim 1 in which said switching means comprises bias means and a first transistor having its base-emitter circuit connected between said bias means and said current sensing means to cause said current passage means to assume one of its states when the armature current exceeds a preset value and to assume the other of its states when the armature current is less than said preset value.

3. Apparatus as claimed in claim 1 in which said bias means comprises diode means and a first resistor serially connected across said first direct voltage source.

4. Apparatus as claimed in claim 2 in which said current passage means comprises a second transistor having its emitter-collector circuit serially connected with a resistor across said armature and having its base connected to said first transistor to prevent current flow through said second transistor emitter-collector circuit when the armature current exceeds said preset value and to permit current flow through said second transistor when the armature current is less than said preset value.

5. Apparatus as claimed in claim 4 in which said current control means comprises:
 a. semiconductor means including a control element and including a current passage path coupling said first direct voltage source to said armature; and
 b. a variable direct voltage source coupled to said semiconductor means control element whereby current flow through said semiconductor means current passage path responds to variations in voltage at said semiconductor means control element.

6. Apparatus for controlling the speed of a direct current motor comprising:
 a first direct voltage source;
 a direct current motor having an armature;
 current-sensing means for sensing current flow through said armature;
 current control means including a current passage path connected serially with said armature and said current-sensing means across said first direct voltage source;
 current passage means across said armature and capable of assuming a first state in which current is allowed to flow therethrough and a second state in which current is prevented from flowing therethrough; and
 switching means including bias means and a first transistor having its base-emitter circuit connected between said bias means and said current-sensing means to cause said current passage means to assume one of its states when the armature current exceeds a preset value and to assume the other of its states when the armature current is less than said preset value.

7. Apparatus as claimed in claim 6 in which said bias means comprises diode means and a first resistor serially connected across said first direct voltage source.

8. Apparatus as claimed in claim 6 in which said current passage means comprises a second transistor having its emitter-collector circuit serially connected with a resistor across said armature and having its base connected to said first transistor to prevent current flow through said second transistor emitter-collector circuit when the armature current exceeds said preset value and to permit current flow through said second transistor when the armature current is less than said preset value.

9. Apparatus as claimed in claim 8 in which said current control means comprises:
 a. semiconductor means including a control element and including a current passage path coupling said first direct voltage source to said armature; and
 b. a variable direct voltage source coupled to said semiconductor means control element whereby current flow through said semiconductor means current passage path responds to variations in voltage at said semiconductor means control element.

10. Apparatus for controlling the speed of a direct current motor comprising:
 a. a first direct voltage source;
 b. a direct current motor having an armature;
 c. current sensing means for sensing current flow through said armature;
 d. first and second resistance means joined together for current flow serially therethrough;
 e. a variable direct voltage source; and
 f. control means for controlling armature current having a current path connected serially with said armature and said current sensing means across said first direct voltage source and having a control element coupled to said first and second resistance means;
 said armature, said control element and said first resistance means forming a first voltage loop;
 said variable direct voltage source, said current sensing means, said control element, and said second resistance means forming a second voltage loop;
 a voltage variation within one of said voltage loops causing a compensating variation in the current flowing serially through the two said resistance means to maintain the armature counter electromotive force substantially equal to the voltage from said variable direct voltage source.

11. Apparatus as claimed in claim 10 in which said control means comprises semiconductor means including a control member connected to the junction of said first and second resistance means and including a current passage path coupling said first direct voltage source to said armature.

12. Apparatus as claimed in claim 10 in which:
 a. said first and resistance passage means comprises first and second resistors serially joined together;
 b. said variable voltage source is serially connected with said first and second resistors across the serial combination of said armature and said current sensing means; and
 c. said control means comprises first transistor means having a collector-emitter circuit coupling said first direct voltage source to a first side of said armature and second transistor means having its collector coupled to the control element of said first transistor means, its emitter connected to a second side of said armature, and its control element connected to the junction of said first and second resistors.